Patented Feb. 28, 1933

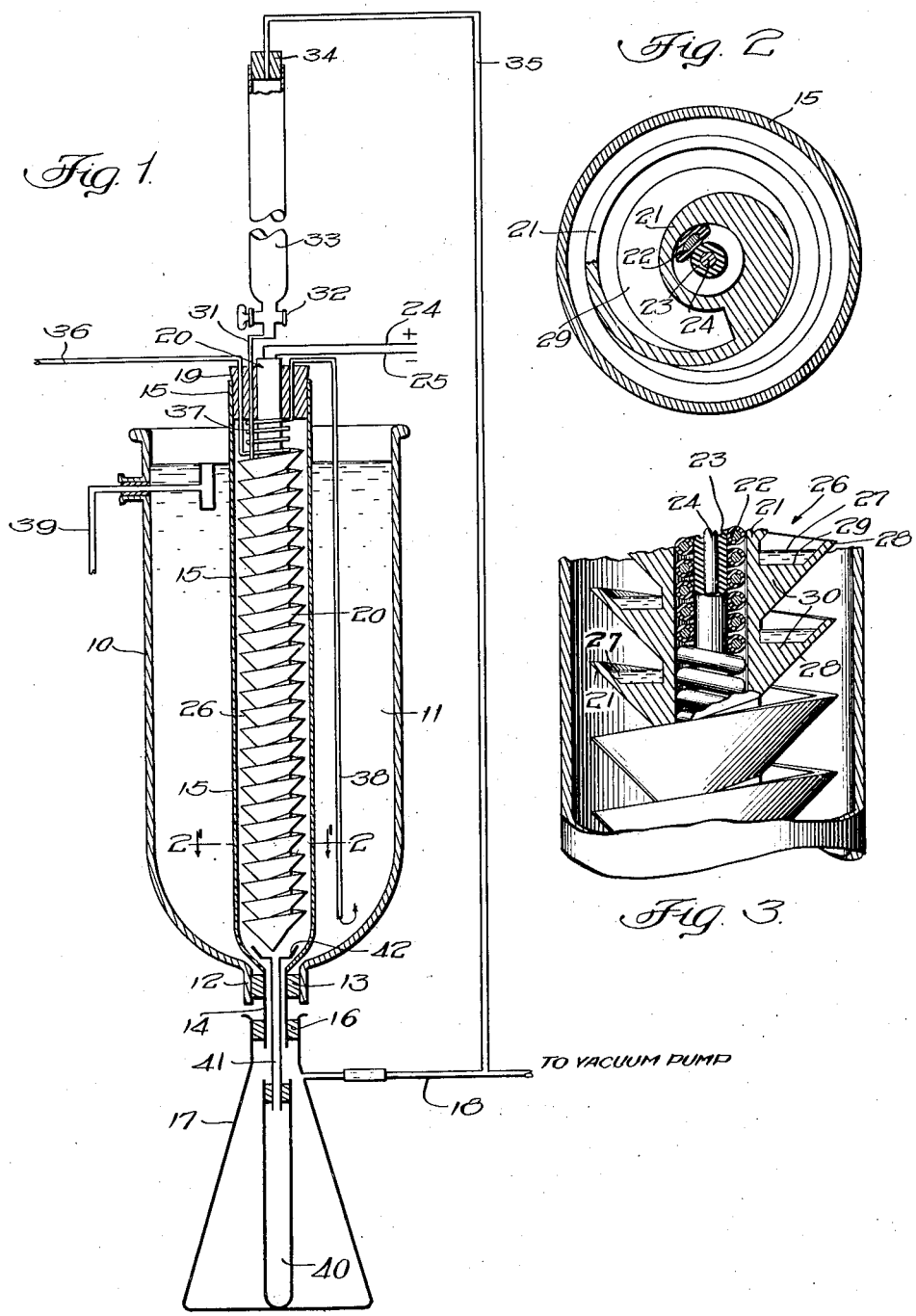

1,899,916

UNITED STATES PATENT OFFICE

ELMER H. PAYNE, OF WOOD RIVER, ILLINOIS, ASSIGNOR TO STANDARD OIL COMPANY, OF CHICAGO, ILLINOIS, A CORPORATION OF INDIANA

VACUUM DISTILLATION

Application filed December 18, 1929. Serial No. 414,931.

This invention relates to vacuum distillation and it pertains more particularly to the distillation of heavy mineral oils.

The object of my invention is to provide a means for distilling heavy lubricating oils without cracking and without entrainment.

A further object is to provide an improved apparatus wherein a shallow stream of oil is heated in close proximity to a condenser surface whereby the molecules evaporated from the liquid are instantaneously condensed.

A further object is to provide means for increasing the exposed surface of oil flowing down a vertical heating column and to increase the time required for the oil to flow from the top to the bottom of said column.

A further object is to provide a vertical heating column having a helical trough adapted to carry a shallow layer of oil, and to uniformly heat the shallow stream as it flows from the top to the bottom of the column.

Other objects will be apparent as the detailed description of my invention proceeds.

The invention contemplates a vertical distillation column surrounded by a shallow trough in close thermal contact therewith. Condensing walls surround said trough and are spaced so close to it that molecules evaporated from liquid in the trough are condensed on said surface almost instantaneously. By using a helical flow the effective length of the heating column is increased without a corresponding increase in the vertical dimension.

This case covers a modification of the invention described in the co-pending application filed by the applicant jointly with Clarke C. Miller.

My invention will be readily understood from the following description of a preferred embodiment which is illustrated in the accompanied drawing, wherein:

Figure 1 is a vertical section of my improved distillation apparatus.

Figure 2 is a horizontal section taken along the lines 2—2 of Figure 1.

Figure 3 is an enlarged detail, partly in section, showing the construction of my improved distillation column and its relation to the condenser.

A cylindrical receptacle 10 contains a suitable cooling fluid 11 such as water. The receptacle is narrowed at its base to form a restricted outlet 12 in which is tightly fitted a stopper 13. The restricted tubular base 14 of condenser cylinder 15 is mounted in said stopper and extends upwardly in the body of cooling fluid. Extended base 14 of condenser cylinder 15 is tightly fitted by stopper 16 to suction flask 17, the side arm of which is connected by a conduit 18 to a vacuum pump (not shown).

The top of condenser cylinder 15 is closed by a stopper 19 which carries the distillation column 20 which may consist of a hollow metallic tube 21 carrying an insulated heating coil 22 wound on insulator tube 23. One end of the heating coil 22 is connected to conductor 24 which is led from the bottom of the column through tube 23, and the other end of the heating coil is connected to conductor 25. Conductors 24 and 25 are connected to a suitable power source (not shown).

A helical trough 26 surrounds the metal tube 21 and carries oil in a thin stream 27 from the top to the bottom of said distillation column. The sides 28 of the trough 26 may be at an angle of about 45° and the bottom 29 of the trough 26 is preferably flat. This flat bottom is obtained by substantially filling the lower part of the trough with metal, it being understood, of course, that the metal tube, the sides of the trough, and the metal filler 30 in the trough may be an integral unit case or machined in one piece.

Oil is fed into trough 26 by suitable conduit 31 extending through stopper 19. This conduit leads to a regulating valve 32 at the base of oil supply 33. The oil supply is closed by a stopper 34 through which extends a conduit 35 leading to the vacuum pump (not shown).

The cooling medium 11 is introduced through conduit 36 and is circulated through coil 37 around the upper end of heating column 20 for the purpose of protecting stopper 19 against the heat from the distillation column 20. The cooling medium is then discharged through conduit 38 into the base of the receptacle 10, an outlet for this medium being provided through conduit 39.

A receiver 40 inside suction flask 17 supports a tube 41 which is enlarged at its upper end to form a cup or funnel 42 to catch the residue dripping from the bottom of column 20.

The operation of my improved apparatus may be described as follows:

When the vacuum pump has reduced the pressure in the system to from 2 to 5 mm. and when the temperature of the heating column 20 has reached the desired temperature, which may be 500° F., the regulating valve 32 is opened and oil (topped and de-aerated Mid-Continent crude) from the supply 33 is fed into the top of the trough. This oil circulates in a thin stream 27 from the top of the column to the base thereof. The depth of the stream and the time required for its travel will depend upon the rate of feeding, the length of the column, the pitch of the trough and the viscosity of the oil at this elevated temperature. I prefer to use a pitch of about 1 to 10 and a column about 5 to 10 feet long. It is obvious, however, that I may contemplate wide variations in these details.

As the oil flows around the column, the oil is evaporated and is almost instantaneously condensed on the adjacent condenser surface. The condensate runs down the vertical condenser cylinder 15 and is cooled in the suction flask 17. The residue drips from the bottom of column 20 into cup or funnel 42 and is directed through conduit 41 to receiver 40.

It should be noted that in this arrangement the bottom of the trough acts as a baffle to catch and collect any oil droplets projected from the flowing stream and to return the collected oil to said stream. This feature with the initial deaeration effectively prevents entrainment.

While I have described a particular embodiment of my invention, it is understood that I am not limited to the details set forth except as defined by the following claims.

I claim:

1. In vacuum distillation apparatus for distilling mineral oils, a column, means for heating said column, and a helical trough around said column and in thermal contact therewith, said trough having a substantially flat bottom so that the oil will flow thereon in a relatively thin film.

2. In vacuum distillation apparatus for distilling mineral oils, a column, means for heating said column, a helical trough around said column and in thermal contact therewith, said trough having a substantially flat bottom so that the oil will flow thereon in a relatively thin film, and a thermal conductor of relatively large cross section between said column and the bottom of said trough whereby the thin layer of oil on the trough will be uniformly heated.

3. In a vacuum distillation apparatus for distilling heavy mineral oils, a distillation column, means for heating said column, a helical trough surrounding said column, said trough having a relatively flat bottom, a thermal conductor for transferring heat from said column to the bottom of said trough, a condenser surface adjacent said column, and means for separately removing liquids from said condenser surface and said column.

ELMER H. PAYNE.